United States Patent [19]
Takano et al.

[11] Patent Number: 5,540,575
[45] Date of Patent: Jul. 30, 1996

[54] HIGH SPEED ROTATING APPARATUS HAVING FACE-TO-FACE ANGULAR CONTACT BALL BEARINGS

[75] Inventors: Susumu Takano; Mutsuo Kubo, both of Kanagawa-ken, Japan

[73] Assignee: NSK Ltd., Tokyo, Japan

[21] Appl. No.: 417,968

[22] Filed: Apr. 6, 1995

Related U.S. Application Data

[62] Division of Ser. No. 25,390, Mar. 2, 1993, Pat. No. 5,409,359.

[30] Foreign Application Priority Data

Mar. 2, 1992 [JP] Japan ................................. 4-78811

[51] Int. Cl.⁶ ................... F04C 18/16; F16C 19/00; F16C 33/40
[52] U.S. Cl. ........................ 418/201.1; 384/613
[58] Field of Search ................ 418/201.1; 384/511, 384/613, 615

[56] References Cited

U.S. PATENT DOCUMENTS

| | | | |
|---|---|---|---|
| 5,009,583 | 4/1991 | Carlsson et al. | 418/201.1 |
| 5,273,413 | 12/1993 | Wallin | 418/201.1 |

FOREIGN PATENT DOCUMENTS

| | | | |
|---|---|---|---|
| 2746151 | 4/1979 | Germany | 384/615 |
| 5397701 | 1/1952 | Japan . | |
| 54-12656 | 1/1979 | Japan . | |
| 58-160621 | 9/1983 | Japan . | |
| 720327 | 12/1954 | United Kingdom | 384/615 |

OTHER PUBLICATIONS

"RHP Precision–High Precisio Bearings", pp. 17–24, (1987).
"Hydraulic Pressure Technology", pp. 1–6, (1987).
Kazuo Shigekawa, "Performance Characteristics of A Screw Expander", *Kobe Steel Engineering Reports*, vol. 34, No. 1, (1984).
SKF Precision Bearing (General Catalogue 1981).
Br. A. B. Jones, "The Life of High–Speed Ball Bearings", Jul. 1952, pp. 695–703, Transactions of the ASME.
Application of Engineering Ceramics to Rolling Bearing (Kikai Sekkei (Mechanical Design), Japan). pp. 66–71.
Tedric A. Harris, "Rolling Bearing Analysis", 1966, pp. 246–253.
New Departure, "Bearing Application", Part One—Principal ball bearing types and fundamentals of mounting, pp. 1–3.
Pumpac "The MRC Bearing System", pp. 1–7.
Wirth, Erkelenz/W. Germany "Milling Machine for Light Metal Ingots", p. 93.
Japanese Literature Excerpt "How to Select and use Rolling Bearings", pp. 325 and 326.
RHP Precision, High Precision Bearings, sections 2.3.4, 2.3.5 and 2.4.

*Primary Examiner*—John J. Vrablik
*Attorney, Agent, or Firm*—Foley & Lardner

[57] ABSTRACT

A combination of two angular type ball bearings provided in a face-to-face arrangement to form a ball bearing unit in which the diameter of the balls of the second ball bearing is less than the diameter of the balls of the first ball bearing. This ball bearing unit is used at high speed to support a substantially unidirectional axial load. When this axial load is applied to the ball bearing unit, only the first ball bearing supports the axial load. The product of the pitch circle diameter of the row of balls in the ball bearing unit and the rotating speed of the inner ring of the ball bearing unit is in the range of 800,000 to 3,000,000 mm.rpm, while the radial load is up to one fifth the axial load.

2 Claims, 6 Drawing Sheets

HIGH SPEED ROTATING APPARATUS HAVING FACE-TO-FACE ANGULAR CONTACT BALL BEARINGS

This application is a division, of application Ser. No. 08/025,390, filed Mar. 2, 1993, now U.S. Pat. No. 5,409,359.

FIELD OF THE INVENTION

The present invention relates to duplex angular contact ball bearing units such as those used for rotatably supporting the rotating shaft of a screw compressor.

BACKGROUND OF THE INVENTION

Figure 6:
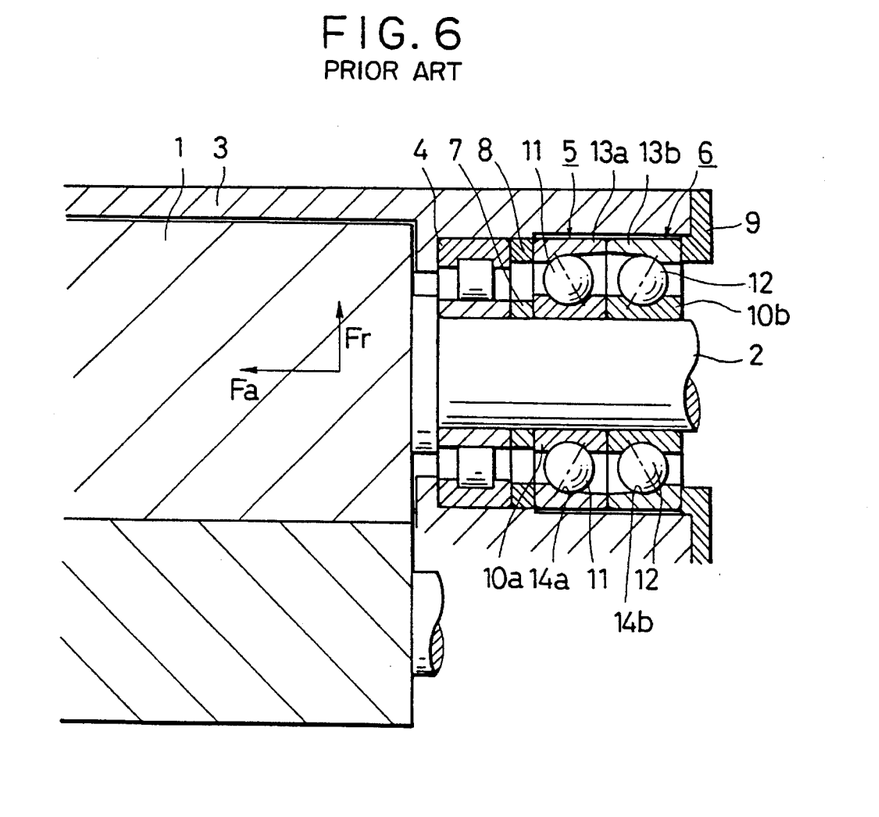
FIG. 6 is a cross sectional view showing a conventional bearing unit.

Conventionally a rolling bearing unit comprising a pair of angular contact ball bearings 5 and 6 as shown in FIG. 6 is used in order to support a shaft 2 such as the rotating shaft of a screw compressor rotating at a high speed. The pair of ball bearings 5 and 6 are combined in a face-to-face arrangement.

It should be noted that if the pair of ball bearings 5 and 6 are combined in a back-to-back arrangement, due to the higher rigidity of the shaft with respect to the bending moment, the following characteristics to the bending moment are made worse, causing serious heat generation and seisure.

The bearing unit in the face-to-face arrangement in FIG. 6 is provided between an outer peripheral face of a rotating shaft 2 fixed to a rotor 1 of the screw compressor rotating at a high speed, and an inner peripheral face of a stationary housing 3. Furthermore the ball bearings 5 and 6 have an inner ring 10a and 10b and an outer ring 13a and 13b with balls 11 and 12 therebetween, respectively, and arranged to be used with a plus-clearance in the face-to-face arrangement, in other words to hold a clearance between the ball bearings 5 and 6 during a high speed rotation. It should be noted that if the ball bearings 5 and 6 are provided with a preload, which is sometimes referred to as a minus-clearance, therebetween, the inner load of the bearings becomes large, causing serious heat generation and seisure, so as not to be used for high rotation.

In FIG. 6, another rolling bearing 4 is provided with spacers 7 and 8 between the rolling bearing 4 and the bearing unit comprising the pair of ball bearings 5 and 6, and a retaining member 9 is mounted to the housing 3 at the axially outer side of the bearing unit.

The present invention is directed to an improvement of the duplex angular contact ball bearing unit used to support an axial load Fa on the rotating shaft 2. The term "axial" means the left and right directions of FIG. 6. On the other hand, the bearing 4 is provided for supporting a load Fr in a radial direction.

In this bearing unit, the ball bearings 5 and 6 juxtaposed in an axial direction have a pathway-or raceway 14a and 14b, respectively, which is made concave to bear the axial load on the rotating shaft 2. The direction of the contact angles α(alpha) of the ball bearings 5 and 6 (refer to FIG. 7) are in opposite directions to each other in the so-called face-to-face arrangement. Consequently, when there is a tendency for the rotating shaft 2 to be displaced to the left in FIG. 6, the left side ball bearing 5 in the same figure supports the axial load. Contrarily, when there is a tendency for the rotating shaft 2 to be displaced to the right, the right side ball bearing 6 supports the axial load. Hence the rotating shaft 2 and the rotor 1 are prevented from axially moving relative to the housing 3.

With the present invention, the situation is considered wherein a substantially unidirectional axial loading Fa (from right to left in the figure) is applied to the rotating shaft 2 rotating together with the rotor 1 during running.

With the duplex angular contact ball bearing unit comprising the pair of angular contact ball bearings 5 and 6 which are arranged in a fixed positioning relationship so as to be prevented from positionally changing with respect to each other, there is a problem that adequate bearing life cannot be achieved with high speed rotation of the shaft 2.

Figure 7:
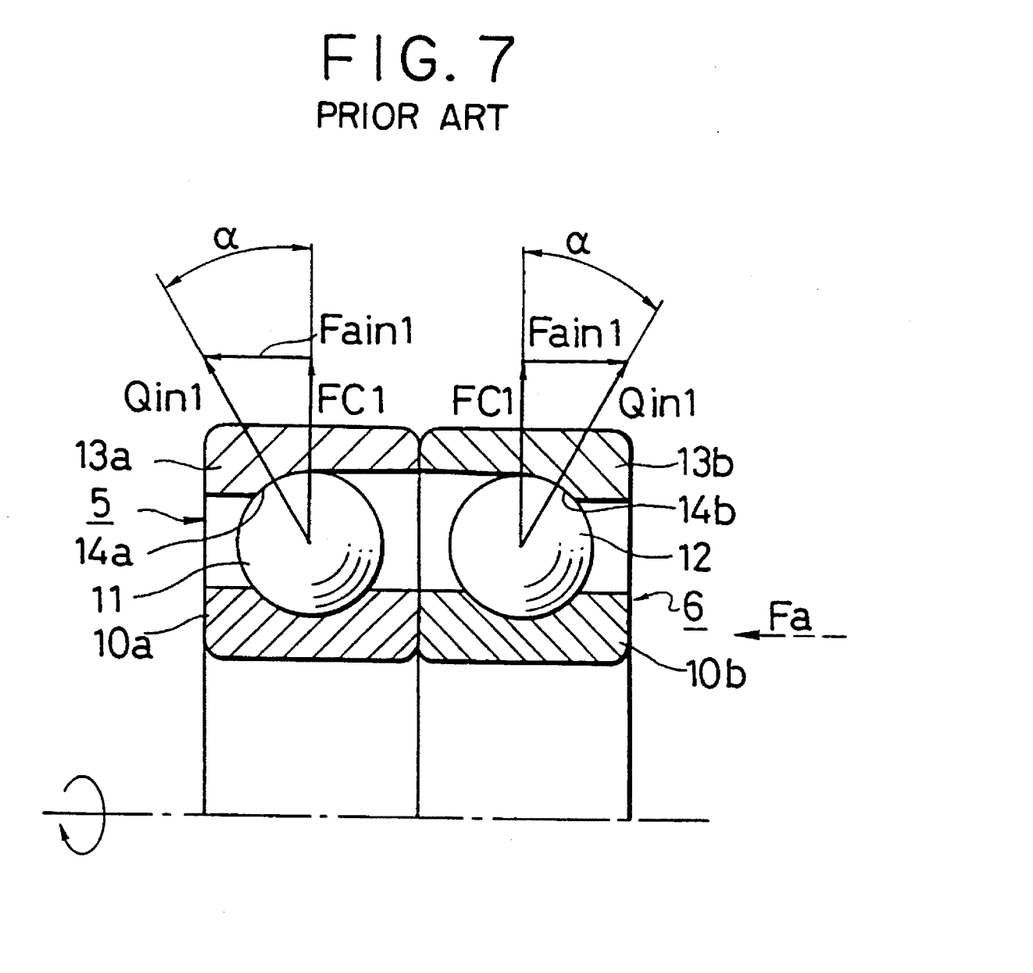
FIG. 7 is a cross sectional view showing essential components of the bearing unit of FIG. 6

FIG. 7 illustrates the forces acting on the bearing unit as a result of the centrifugal forces produced by high speed rotation. More specifically, when the rotating shaft 2 rotates at a high speed, a centrifugal force Fc1 acts on the balls 11 and 12 of the respective ball bearings 5 and 6. Due to this centrifugal force, the balls 11 and 12 of the respective ball bearings 5 and 6 are pressed with a force Qin1 in a direction of the contact angle α(alpha) against the outer raceways or pathway 14a and 14b, respectively. It should be noted that the axial components of the forces Qin1 on the ball bearings 5 and 6 are opposed to each other. Consequently, the balls 11 of the ball bearing 5 are pressed in an axially leftward direction against the outer raceway 14a under an axially leftward force component Fain1 of the force Qin1, while the balls 12 of the ball bearing 6 are pressed in an axially rightward direction against the outer raceway 14b under an axially rightward force component Fain1 of the force Qin1.

As a result, an internal axial loading corresponding to the sum (Fain1 +Fain1) of the components of force Qin1 is produced in the assembled ball bearings 5 and 6. Hence the pressure on contact surface between the balls 11 and 12 and the inner raceways 14a and 14b is increased, resulting in a reduction in fatigue life of the respective ball bearings 5 and 6.

To prevent a reduction in bearing life due to the above cause, the balls 11 and 12 in the both of the ball bearings 5 and 6 may be made from a light weight ceramic material, or balls of a small diameter may be used for both rows of the balls 11 and 12 to reduce the centrifugal force Fc1. Further, it is expected to make the contact angle smaller in the both rows of balls 11 and 12 to reduce Fain1.

However, when both rows of balls 11 and 12 are made from a ceramic material having a large modulus of direct elasticity, a pressure on contact surface between the outer raceways 14a and 14b and the balls 11 due to the balls 11 pressed against the outer raceways 14a and 14b is generally greater than the value for when the balls are made from bearing steel. Particularly with the ball bearing 5 which supports an external load (for example, the left side ball bearing 5 subjected to the beforementioned axial load Fa as a dotted arrow in FIG.7), the pressure is so large that the fatigue life of the ball bearing 5 is reduced, and the total fatigue life of the assembled ball bearings 5 and 6 is reduced.

Furthermore, when both rows of balls 11 and 12 have small diameter balls or small contact angle balls, the axial load capacity of the respective ball bearings 5 and 6 is reduced resulting in a reduction in fatigue life.

The angular contact ball bearing units of the present invention are addressed towards the above circumstances.

SUMMARY OF THE INVENTION

The duplex angular contact ball bearing unit of the present invention, as with the conventional rolling bearing unit, comprises at least a pair of angular contact ball bearings provided between the outer peripheral surface of a shaft and the inner peripheral surface of a housing arranged with their corresponding contact angles in different directions, such that during use a substantially unidirectional axial loading externally applied is supported by one of the pair of ball bearings.

In the angular contact ball bearing unit according to the present invention during running, one of the ball bearings having a large load capacity is used to support the axial load externally applied, while the other ball bearing which does not support the axial load during running is made so as to minimize the increase in internal axial loading due to centrifugal forces. As a result, it is possible to minimize the overall reduction in fatigue life of the rolling bearing unit assembly made from the pair of angular contact ball bearings.

DETAILED DESCRIPTION OF THE PREFERRED EMBODIMENTS

Like numerals correspond to like elements throughout the drawings, and detailed descriptions on the elements made for the conventional rolling bearing unit are omitted. The term "axial" means the left and right directions in the drawings.

Figure 1:
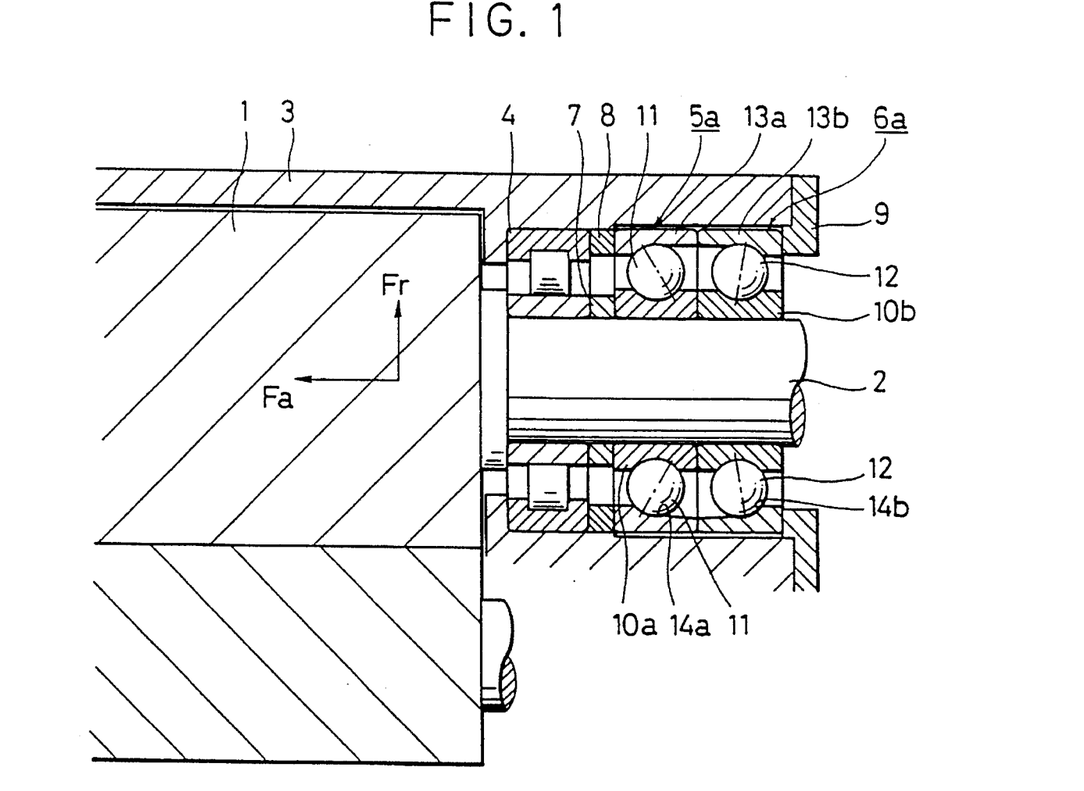
FIG. 1 is a cross sectional view showing a first embodiment of the angular contact ball bearing unit according to the present invention.
Figure 2:
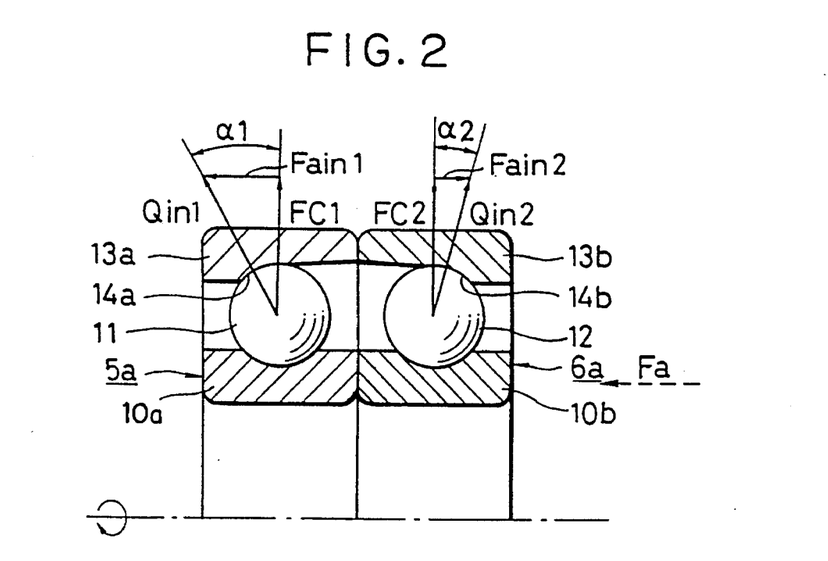
FIG. 2 is a cross sectional view of essential components of the angular contact ball bearing unit of FIG. 1.

FIGS. 1 and 2 show a first embodiment of the present invention. The duplex angular contact ball bearing unit of the present embodiment comprises a pair of bearings 5a and 6a provided between a housing 3 and a rotatory shaft 2 of a rotor 1 for rotating at a high speed. The pair of bearings 5a and 6a are axially juxtaposed with a slight clearance therebetween. The bearing 5a has balls 11 between an inner ring 10a and an outer ring 13a, while the bearing 6a has balls 12 between an inner ring 10b and an outer ring 13b.

In the duplex angular contact ball bearing unit of the present embodiment to receive a unidirectional axial load Fa, the contact angle of one of the ball bearings (unloaded side) is made smaller than the contact angle of another of the ball bearings (loaded side). The axial load Fa is directed left in the drawings as indicated by a dotted arrow.

The duplex angular contact ball bearing unit of the present embodiment comprises a pair of first angular contact ball bearing 5a and second angular contact ball bearing 6a which are made in the same material and size, and the contact angle $\alpha 2$ of the second ball bearing 6a provided on the side which does not support the axial force Fa during running (right side in FIGS. 1 and 2) is made smaller than the contact angle $\alpha 1$ of the first ball bearing 5a provided on the side which supports the axial load Fa (left side in FIGS. 1 and 2) externally applied during running (in other words, $\alpha 2 < \alpha 1$). The pair of first and second ball bearings 5a and 6a are combined to form a face-to-face arrangement.

With this construction, by making the contact angle $\alpha 1$ of the first ball bearing 5a greater than the contact angle $\alpha 2$ of the second ball bearing 6a, sufficient axial load capacity of the first ball bearing 5a may be ensured.

In this respect, if the contact angle $\alpha 1$ is made the same as the contact angle $\alpha$(alpha) of the ball bearings 5 and 6 assembled in the conventional bearing unit (in other words, $\alpha = \alpha 1$), then the axial component of force Qin1 acting on the first ball bearing 5a due to the centrifugal force Fc1 becomes Fain1. Furthermore, the axial component of force Qin2 applied to the second ball bearing 6a becomes Fain2. In this case, the centrifugal forces Fc1 and Fc2 become same, because the material and size of the balls are same, on the other hand the contact angle $\alpha 2$ of the second ball bearing 6a is less than the contact angle $\alpha 1$ the first ball bearing 5a. Consequently, the axial component of force Fain2 applied to the second ball bearing 6a is less than the axial component of force Fain1 acting on the corresponding second ball bearing 6 of the conventional unit (in other words, Fain2<Fain1).

As a result, the internal axial loading produced in the assembled ball bearings due to the centrifugal force is the sum of Fain1+Fain2, which is less than the internal axial loading, Fain1+Fain1, produced in the conventional bearing unit.

Consequently, the pressure on contact surface between the balls 11 and 12 and the outer raceways 14a and 14b of the above-mentioned ball bearings 5a and 6a is reduced. Furthermore, the reduction in rolling fatigue life of the respective ball bearings 5a and 6a may be minimized, and the reduction in life of the rolling bearing unit made up of the pair of angular type ball bearings 5a and 6a may also be minimized.

Three examples of the bearing units were prepared for comparison, each comprising the two angular type ball bearings (7305 type) having an inner diameter of 25 mm, an outer diameter of 62 mm and a width of 17 mm. These ball bearings are assembled in a face to face arrangement with a measured axial clearance of 0.030 mm at the time of manufacture (as shown in each of the figures). The rolling fatigue life of each of the ball bearings in the three examples was then measured in the case where the ball bearings are fitted to a rotating shaft rotating at 23,000 rpm and carrying an axial load of 67.0 kgf. The results are given in Table 1.

The results in the three examples were calculated with the contact angle of the first ball bearing on the side carrying the axial load all set at 30 degrees, and with the contact angle of the second ball bearing on the other side differently set at 15, 30 and 40 degrees, respectively. The first ball bearing may be referred to as loaded side bearing while the second ball bearing may be referred to as unloaded side bearing.

Incidentally, once the axial clearance is measured upon fabrication of the bearings as identified above, any clearance is generally kept during rotation, which is suitable for high speed rotation.

As shown by the results of these calculations, the life of the rolling bearing unit (Ex. No.1) of the present invention is significantly increased compared to that for the conventional rolling bearing unit (Ex. No.2) and the other unit (Ex. No.3).

The calculations mentioned above are based on the condition of dm.n=1,000,000 mm.rpm and Fr=0 kgf. The "dm.n" means the product of the pitch circle diameter of the row of balls and the rotating speed of the inner ring in the ball bearing. According to further calculations, the extended life of the ball bearing unit of the instant invention is expected as shown in FIG. 11 in the range of dm.n=from 700,000 to 2,000,000 mm-rpm and Fr≦2Fa.

Figure 11:
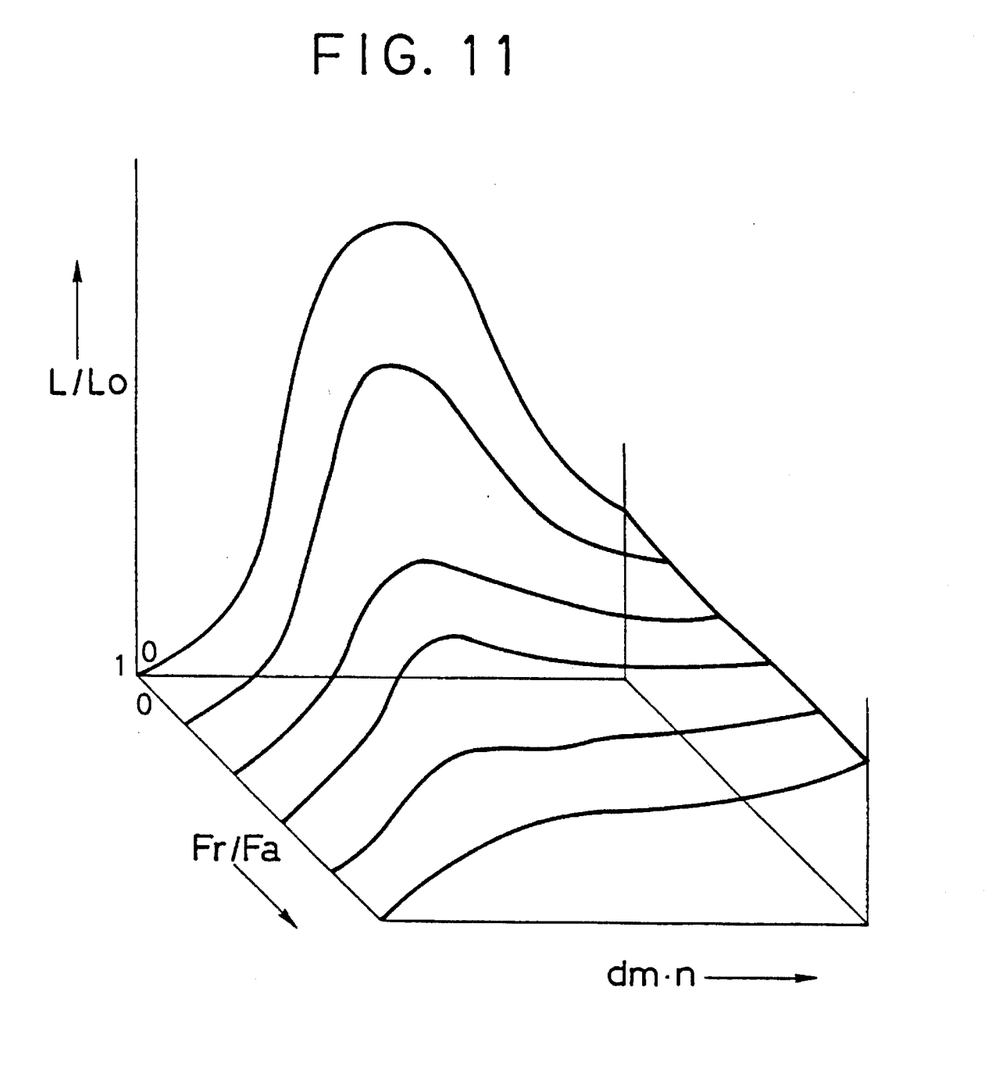
FIG. 11 is three-dimensional view of graph representing a relationship of the load components, the rotation speed and the life of the bearing.

FIG. 11 is a three-demensionel view of graph showing a relationship between the life ratio L/Lo, the load ratio Fr/Fa, and the rotating speed dm.n, where L is a life of the ball bearing unit of the present invention and Lo is a life of the conventional ball bearing units as shown in FIG. 6.

clearance set during rotation, which is suitable for high speed rotation.

Figure 3:
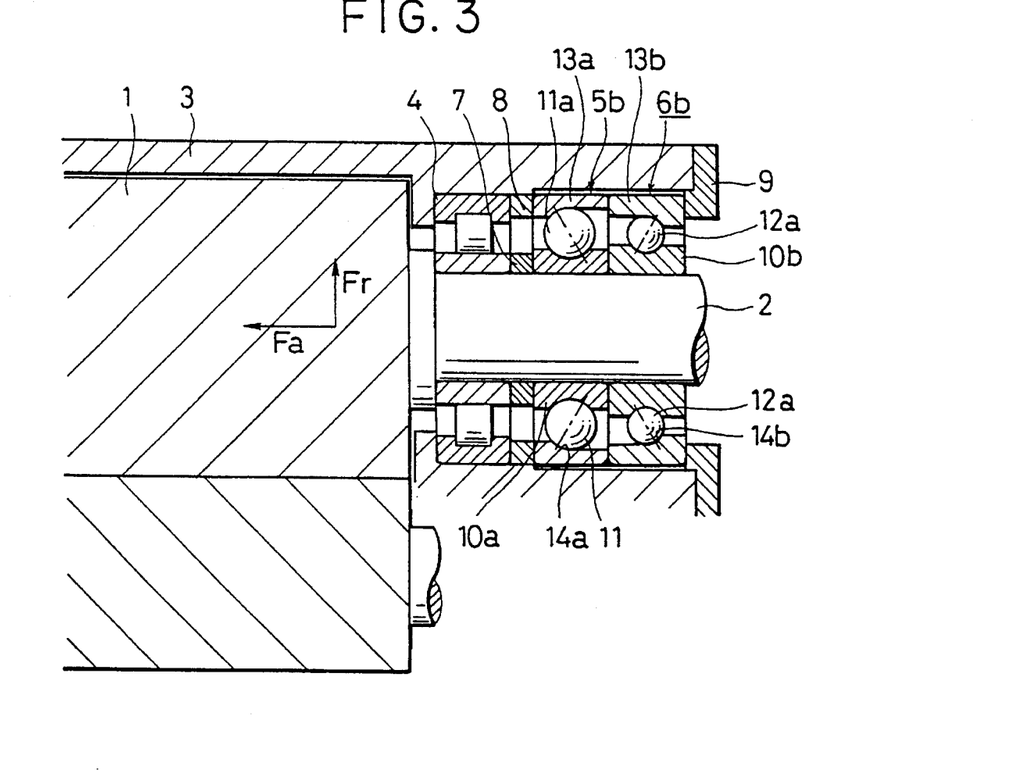
FIG. 3 is a cross sectional view showing a second embodiment of the angular contact ball bearing unit according to the present invention.
Figure 4:
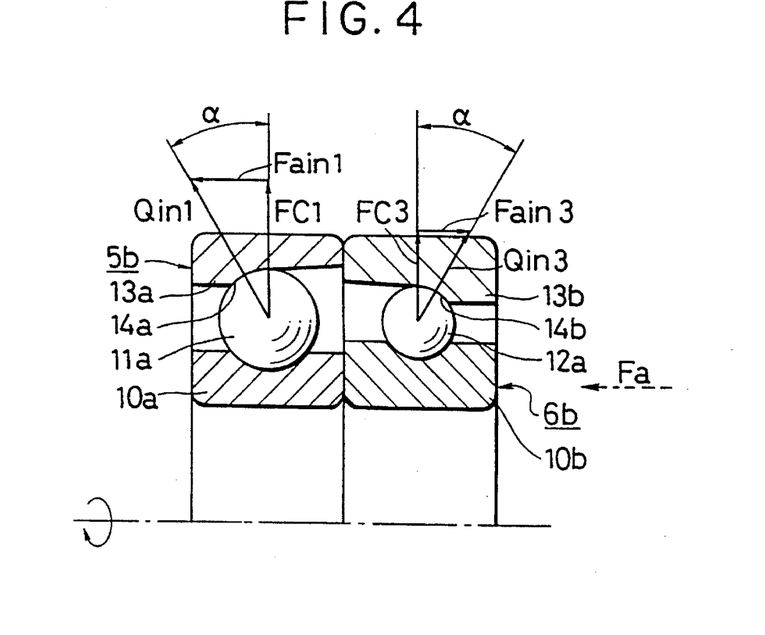
FIG. 4 is a cross sectional view of essential components of the angular contact ball bearing unit of FIG. 3.

By making the diameter of the balls 11a of the first ball bearing 5b larger with the diameter of the balls 12a of the second ball bearing 6b smaller, sufficient load capacity of the first ball bearing 5b may be ensured. In the present case, the axial component of force Qin1 acting on the first ball bearing 5b due to centrifugal force is Fain1, while the axial component of force Qin3 applied to the second ball bearing 6b is Fain3. Since in the present case, the diameter of the ball 12a of the second ball bearing 6b is small, the centrifugal force acting on the ball 12a is small. Hence the axial component of force Fain3 applied to the second ball bearing 6b becomes smaller than the axial component of force Fain1 acting on the ball bearing 6 of the conventional bearing unit (in other words, Fain3<Fain1). Consequently, the internal axial loading produced in the assembled ball bearings due to the centrifugal force is the sum of Fain1+Fain3 which is smaller than the internal axial load the sum of Fain1+Fain1 produced in the conventional bearing unit.

As a result, the pressure on contact surface between the balls 11a and 12a and the outer raceways 14 of the first and second ball bearings 5b and 6D is reduced. Consequently, the drop in rolling fatigue life of the first and second ball bearings 5b and 6b may be minimized and the drop in life of the angular ball bearing unit comprising a pair of angular ball bearings 5b and 6b may be minimized.

TABLE 1

| Ex. No. | Contact angle (degree) | | Internal axial load (kgf) | | Pressure on contact surface between outer raceway and ball (kgf/mm²) | | Calculated life (hr) | | |
|---|---|---|---|---|---|---|---|---|---|
| | Loaded side brg | Unloaded side brg | Loaded side | Unloaded side | Loaded side | Unloaded side | Loaded side | Unloaded side | Total life |
| 1 | 30 | 2) 15 | 82.8 | 15.7 | 71.0 | 60.8 | 98,400 | 787,000 | 90,100 |
| 2 | | 1) 30 | 115.0 | 47.9 | 78.1 | 61.5 | 36,700 | 339,000 | 34,100 |
| 3 | | 40 | 148.2 | 81.1 | 81.1 | 69.9 | 16,400 | 184,000 | 15,400 |

1) Conventional bearing unit
2) Bearing unit of the present invention

Next a second embodiment of the present invention is shown in FIGS. 3 and 4. With duplex the angular contact ball bearing unit in this embodiment, the diameter of the balls of one of the ball bearings (unloaded side bearing) is less than the diameter of the balls of another of the ball bearings (loaded side bearing) with the balls all being made of the same material.

In this embodiment, an external load Fa is axially applied to the bearing unit as shown by a dotted arrow, and the first angular contact ball bearing 5b is provided on the side supporting the external axial load Fa applied to the rotating shaft 2 during running (left side in FIGS. 3 and 4), and the diameter of the balls 11a of the first ball bearing 5b is made large as with the diameter of the balls 11 and 12 of the ball bearings 5 and 6 (FIG. 6 and FIG. 7) of the conventional ball bearing unit, while the second angular contact ball bearing 6b is provided on the side which does not support the axial load Fa during running (right side in FIGS. 3 and 4), and the diameter of the balls 12a of the second ball bearing 6b is made smaller.

Incidentally, the first and second ball bearings 5b and 6b are combined in a face-to-face arrangement with any plus No table for calculation results as in Table 1 is shown for the second embodiment, but the arrangement of smaller balls on the unloaded side bearing in the angular ball bearing unit has apparently similar effects on the axial component of force as in the first embodiment.

This is also supported by the following embodiment.

Figure 5:
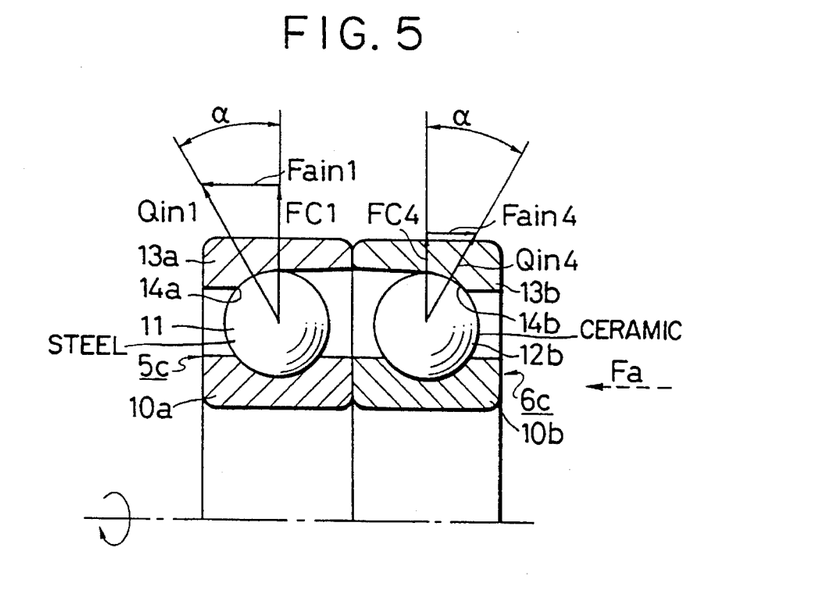
FIG. 5 is a cross sectional view showing essential components of a third embodiment of the angular contact ball bearing unit according to the present invention.

FIG. 5 shows a third embodiment of the present invention. The axial load Fa is directed left in the drawings as indicated by a dotted arrow. With this ball bearing unit, the balls of one of the ball bearings (unloaded side bearing) are made of ceramic, while the balls of another of the ball bearings (loaded side bearing) are made of bearing steel with the balls being of the same size.

The balls 11 of the first angular contact ball bearing 5c is provided on the side supporting the external axial load Fa applied to the rotating shaft 2 during running (left side in FIG. 5), and the ball 11 of the first ball bearing 5c are made of bearing steel as with the balls 11 and 12 of the ball bearings 5 and 6 of the conventional ball bearing units (FIG. 6 and FIG. 7), while the second angular contact ball bearing 6c is provided on the side which does not support the axial load Fa during running (right side in FIG. 5), and the balls

12b of the second ball bearing 6c are made from a ceramic material which is lighter in weight than the bearing steel.

Incidentally, the first and second ball bearings 5c and 6c are combined in a face-to-face arrangement with any plus clearance set during rotation, which is suitable for high speed rotation.

Since the balls 11 of the first ball bearing 5c are made of bearing steel in the above constructions sufficient load capacity of the first ball bearing 5c may be ensured. In the present case, the axial component of force Qin1 acting on the first ball bearing 5c due to the centrifugal force is Fain1, while the axial component of force Qin4 applied to the second ball bearing 6c is Fain4. Since in the present case the balls 12b of the second ball bearing 6c are light in weight, in other words have a lower specific gravity, the centrifugal force acting on the balls 12b is small. Hence the axial component of force Fain4 applied to the second ball bearing 6c is smaller than the axial component of force Fain1 acting on the ball bearing 6 of the above-mentioned conventional bearing unit (in other words, Fain4 <Fain1). Consequently, the internal axial loading produced in the assembled ball bearings due to centrifugal force is the sum of Fain1 +Fain4, which is smaller than the internal axial load, Fain1 +Fain1, produced in the conventional unit.

As a result, the pressure on contact surface between the balls 11 and 12b and the outer raceways 14 of the respective ball bearing 5c and 6c is reduced. Consequently the drop in rolling fatigue life of the respective ball bearings 5c and 6c may be minimized and the drop in life of the duplex angular contact ball bearing unit comprising a pair of angular contact ball bearings 5c and 6c may be minimized.

Four examples of the bearing units were prepared for comparison with the material of the balls 11 and 12b of the respective ball bearings 5c and 6c changed, and the rolling fatigue life of the respective ball bearings 5c and 6c are calculated. The results are given in the following Table 2. The fatigue life was calculated under similar conditions to those for the before-ementioned first embodiment except that the contact angle was set at 30 degrees for all of the respective ball bearings 5c and 6c.

Although the calculations mentioned above are based on the condition of dm.n=1,000,000 and Fr=0 kgf, the extended life of the ball bearing unit of the instant invention is expected as shown in FIG. 11 in the range of dm.n= from 800,000 to 3,000.000 mm. rpm and Fr$\leq$⅕ Fa.

The present invention is not limited to a ball bearing unit made from a pair of angular contact ball bearings assembled together face to face, and may also be applicable to an assembly of two or more pairs of ball bearings wherein the contact angle of at least one of the ball bearings is changed. Furthermore, the invention may be applicable to an arrangement with a spacer between the pair of assembled ball bearings. In addition, two or three of the ball bearing units as shown in the different embodiments may be combined together.

Incidentally, in the high speed operation as mentioned above, it is uncovered that the bearing having a retainer to be guided by the inner ring in the ball bearing is subject to a condition where the lubricant is hard to be held between the outer peripheral surface (guide surface) of the inner ring rotating at a high speed and the inner peripheral surface of the retainer, so that abnormal abrasion is caused on the retainer due to the poor lubrication. Accordingly, the bearing must have a retainer to be guided by the outer ring on the stationary side so as to keep the lubrication good between the inner peripheral surface of the outer ring and the outer peripheral surface of the retainer.

Figure 8:
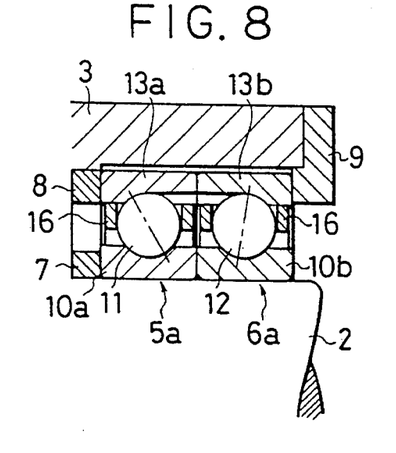
FIG. 8 is a cross sectional view showing a fourth embodiment of the angular contact ball bearing unit according to the present invention.
Figure 9:
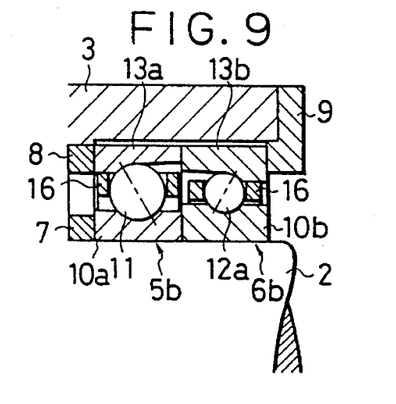
FIG. 9 is a cross-sectional view showing a fifth embodiment of the angular contact ball bearing unit according to the present invention.
Figure 10:
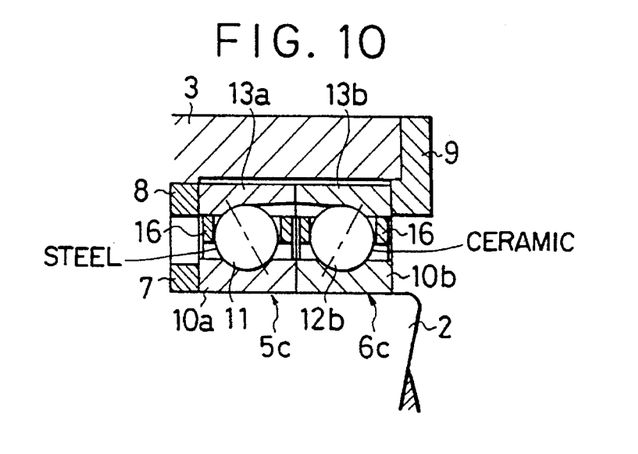
FIG. 10 is a cross sectional view showing a sixth embodiment of the angular ball bearing unit according to the present invention.

FIG. 8 to FIG. 10 show positioning of the retainer 16 in the fourth to sixth embodiments of the present invention corresponding to the first to third embodiments.

Since the present invention operates with the above mentioned construction, sufficient load capacity to carry the external axial load may be ensured, while reducing the internal axial loading with an improvement in bearing unit endurance.

Aspects of the present invention have been described by way of example only and it should be appreciated that modifications and additions may be made thereto without departing from the scope thereof as defined in the appended claims.

TABLE 2

| Ex. No. | Ball Material | | Internal axial load (kgf) | | Pressure on contact surface between outer raceway and ball (kgf/mm$^2$) | | Calculated life (hr) | | |
|---|---|---|---|---|---|---|---|---|---|
| | Loaded side | Unloaded side | Loaded side | Unloaded side | Loaded side | Unloaded side | Loaded side | Unloaded side | Total life |
| 1 | Steel ball | 1) Steel ball | 115 | 47.9 | 78.1 | 61.5 | 36,700 | 339,000 | 34,100 |
| 2 | Ceramic ball | Steel ball | 97.3 | 30.3 | 81.8 | 56.2 | 19,000 | 558,000 | 18,500 |
| 3 | Steel ball | 2) Ceramic ball | 88.0 | 21.0 | 72.0 | 51.7 | 82,300 | 1,560,000 | 79,400 |
| 4 | Ceramic ball | Ceramic ball | 78.8 | 11.7 | 76.2 | 46.3 | 37,600 | 2,730,000 | 37,300 |

1) Conventional bearing unit
2) Bearing unit of the present invention

As shown by the results of these calculations, the life of the rolling bearing unit (Ex. No.3) of the present invention is significantly increased compared to that for the conventional rolling bearing unit (Ex. No.1 and the other units (Ex. Nos.2 end 4).

What is claimed is:
1. A high speed rotating apparatus comprising a rotating shaft with an outer peripheral surface, a support housing with an inner peripheral surface, and a duplex angular contact ball bearing unit provided between the shaft and the housing, the duplex angular contact ball bearing unit com- prising a pair of first and second angular contact ball bearings each having outer and inner rings and a row of balls between the outer and inner rings, and provided between the outer peripheral surface of the shaft and the inner peripheral surface of the housing to bear axial and radial loads, such that when an axial load is applied to the bearing unit from outside during use, the axial load from outside is supported by the first ball bearing only, the ball bearing unit used in a condition where the product of the pitch circle diameter of the row of balls and the rotating speed of the inner ring is in the range of 800,000 to 3,000,000 mm.rpm, and where the radial load is up to one fifth of the axial load, and the first and second ball bearings juxtaposed in a face-to-face arrangement, and the balls having a diameter such that the diameter of the balls of the second ball bearing is less than the diameter of the balls of the first ball bearing;

wherein the first and second ball bearings have a retainer which is held by the outer ring so that the outer peripheral surface of the retainer is guided by the inner peripheral surface of the outer ring.

2. A screw compressor comprising a rotating shaft with an outer peripheral surface having compression screw, a housing with an inner peripheral surface, and a duplex angular contact ball bearing unit and a cylindrical roller bearing provided at one end of the screw compressor, the duplex angular contact ball bearing unit comprising a pair of first and second angular contact ball bearings each having outer and inner rings and a row of balls between the outer and inner rings, and provided between the outer peripheral surface of the shaft and the inner peripheral surface of the housing to bear axial and radial loads, such that when an axial load is applied to the bearing unit from outside during use, the axial load from outside is supported by the first ball bearing only, the ball bearing unit used in a condition where the product of the pitch circle diameter of the row of balls and the rotating speed of the inner ring is in the range of 800,000 to 3,000,000 mm.rpm, and where the radial load is up to one fifth of the axial load, and the first and second ball bearings juxtaposed in a face-to-face arrangement, and the balls having a diameter such that the diameter of the balls of the second ball bearing is less than the diameter of the balls of the first ball bearing;

wherein the first and second ball bearings have a retainer which is held by the outer ring so that the outer peripheral surface of the retainer is guided by the inner peripheral surface of the outer ring.

* * * * *